United States Patent
Shor et al.

(10) Patent No.: US 9,094,908 B1
(45) Date of Patent: Jul. 28, 2015

(54) DEVICE AND METHOD FOR SYNCHRONIZATION IN A MOBILE COMMUNICATION SYSTEM

(71) Applicants: Roi Menahem Shor, Tel Aviv (IL); Ori Goren, Kibutz Ruchama (IL); Avraham Horn, Givat Shmuel (IL)

(72) Inventors: Roi Menahem Shor, Tel Aviv (IL); Ori Goren, Kibutz Ruchama (IL); Avraham Horn, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/258,394

(22) Filed: Apr. 22, 2014

(51) Int. Cl.
*H04L 7/00* (2006.01)
*H04W 56/00* (2009.01)
*H04L 7/033* (2006.01)

(52) U.S. Cl.
CPC .......... *H04W 56/0015* (2013.01); *H04L 7/033* (2013.01)

(58) Field of Classification Search
CPC ......... G06F 1/10; H04J 3/0685; H04J 3/0688; H04J 3/0638; H04L 7/0008
USPC ....................................... 375/356
See application file for complete search history.

(56) References Cited

U.S. PATENT DOCUMENTS

| | | | |
|---|---|---|---|
| 6,275,553 B1 * | 8/2001 | Esaki ........................ | 375/371 |
| 2007/0116046 A1 * | 5/2007 | Liu et al. ................... | 370/466 |
| 2007/0195916 A1 * | 8/2007 | Itahara ...................... | 375/376 |
| 2009/0238154 A1 | 9/2009 | Bommas et al. | |
| 2009/0245228 A1 * | 10/2009 | Osterling .................. | 370/350 |
| 2010/0329404 A1 * | 12/2010 | Xiang et al. .............. | 375/356 |
| 2013/0107998 A1 * | 5/2013 | Przada et al. ............. | 375/362 |

OTHER PUBLICATIONS

Ericsson AB et al., "CPRI Specification V6.0: Common Public Radio Interface (CPRI); Interface Specification," Ericsson AB, Huawei Technologies Co. Ltd., NEC Corp., Alcatel Lucent, Nokia Siemens Networks GmbH & Co. KG; Aug. 30, 2013; downloaded from <<http:www.cpri.info/spec.html>>, 128 pages.

U.S. Appl. No. 14/258,415, filed Apr. 22, 2014 entitled "Synchronization circuitry, common public radio interface enable device, and a method of synchronizing a synchronized clock signal of a second transceiver to a clock of a first transceiver".

* cited by examiner

*Primary Examiner* — Juan A Torres (57) ABSTRACT

Interfacing between radio units in a base station in a mobile communication system may use synchronized clocks. A controller device has a tracking clock circuit for generating a transmit clock, the tracking clock circuit comprising a clock input for receiving a reference clock and a sync input for receiving an external synchronization signal. A multiplying phase locked loop generates the transmit clock in dependence on the reference clock and a divider output of a controllable divider coupled to the transmit clock. A tracking loop has a phase detector coupled to the sync input and the divider output for detecting a phase error between the external synchronization signal and transmit clock, and a phase control circuit for generating a phase control signal based on the phase error, the phase control signal being coupled to a control input of the controllable divider for adapting the division function.

20 Claims, 6 Drawing Sheets

DEVICE AND METHOD FOR SYNCHRONIZATION IN A MOBILE COMMUNICATION SYSTEM

CROSS REFERENCE TO RELATED APPLICATIONS

The present application is related to U.S. patent application Ser. No. 14/258,415, entitled "SYNCHRONIZATION CIRCUITRY, COMMON PUBLIC RADIO INTERFACE ENABLE DEVICE, AND A METHOD OF SYNCHRONIZING A SYNCHRONIZED CLOCK SIGNAL OF A SECOND TRANSCEIVER TO A CLOCK OF A FIRST TRANSCEIVER," filed on Apr. 22, 2014, the entirety of which is herein incorporated by reference.

FIELD OF THE INVENTION

This invention relates to a controller device for a base station, a radio equipment controller unit for a base station, method, and a computer program

BACKGROUND OF THE INVENTION

Mobile communication systems, such as fourth generation (4G) cell based mobile communication system such as LTE (Advanced) systems (Long Term Evolution, which is the most recent step forward from cellular 3G services) or the Wideband Code Division Multiple Access (WCDMA) system, comprise base-stations which provide a wireless or 'air interface' between the mobile phone or other mobile equipment and the base-station.

A base station for a mobile communication network may comprise different types of units including one or more radio equipment units coupled to respective antennas and one or more radio equipment controller units for controlling the radio equipment unit. The radio equipment unit basically performs the radio frequency, RF, related functions such as frequency shifting, sampling of the RF signals, quantization of I and Q values etc. The radio equipment controller performs baseband functions and controls the radio equipment unit.

In the past, base-stations would be provided with a small cabinet at the base of the antenna tower, in which appropriate equipment to perform all base-station functions was provided. Thus each antenna would have its own dedicated equipment for both the RF functions and the baseband functions. However, newer generations of radio base station systems use a split into sub-systems so that the baseband functions are separated from the RF functions and provided in another subsystem.

The baseband subsystem is typically in a cabinet or other housing, and connected to a remote RF subsystem via an optical fiber of suitable length or other, e.g. wired, link suitable to transport signals over a long distance (typically the baseband and RF subsystem are separated by a distance of 1 km or more, e.g >10 km). The remote RF subsystem is housed in what is commonly referred to as a "radio head" which further contains the antenna. Furthermore, the baseband subsystem may be connected to several antennas separated from each other by relatively long distances (>1 km for instance) and control the RF subsystems of multiple radio units. The radio-heads of several spaced-apart antennas are thus simultaneously controlled by the same base-station, located at a distance (e.g. >1 km, such as >10 km) from the radio-heads.

In such new generations of base-stations, multiple radio equipment controller units and/or radio equipment units may be coupled in a chain, while such a chained unit may process part of the data samples and/or control data and forward a further part to a subsequent unit. The units may have, for interfacing between the units, a data interface for streaming data samples using a transmit clock. The transmit clock of the chain typically needs to be synchronized with high precision to an external synchronization signal, such as a GPS signal or a signal generated with e.g. the precision time protocol (as standardized in IEEE 1588). For example both the Open Base Station Architecture Initiative (OBSAI) and the Common Public Radio Interface (CPRI) require such high accuracy synchronization.

In the known solutions, synchronization to the external synchronization signal requires a separate device, e.g. an external integrated circuit which comprises a phase locket loop (PLL) driven by e.g. a crystal oscillator and a synchronization device which synchronizes the PLL to the external synchronization signal or comprising an external controllable oscillator which is controlled by the REC subsystem to be synchronized to the external synchronization signal. United States patent application US2009/0238154 for example describes synchronization of assemblies in a base station to a reference clock signal. A local clock signal and a frame are formed in a first assembly. The clock signal and the frame are transmitted, using a synchronous transmission with a predictable propagation time, to a second assembly. A reference clock signal is received in the second assembly, and a phase difference and a time difference between the transmitted clock signal on the one hand and the reference clock signal on the other hand are determined. The phase difference and the time difference are transmitted from the second assembly to the first assembly via a link without a predictable propagation time. The phase difference and the time difference are used in the first assembly to determine a manipulated variable which controls the formation of the local clock signal, such that the first and the second assemblies are synchronized in time. However, the transmission from the second assembly to the first assembly introduces latency between the measurement and actual control of the local clock signal in the first assembly.

However, such a separate synchronization device may not be accurate enough. CPRI the synchronization between radio equipment controller (REC) and radio equipment (RE) requires an accuracy of 1 nSec and current synchronization solutions, which are based on external controllable oscillators, may not be accurate enough to comply with the requirements of the CPRI specification.

However, such a separate synchronization device may not be accurate enough. CPRI the synchronization between REC and RE requires an accuracy of 1 nSec and current synchronization solutions, which are based on external controllable oscillators, may not be accurate enough to comply with the requirements of the CPRI specification.

SUMMARY OF THE INVENTION

The present invention provides a controller device, a baseband subsystem, a method, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the examples in the drawings. Elements in the FIGS. are illustrated for simplicity and clarity and have not necessarily been drawn to scale.

In the FIGS. corresponding elements have the same reference numerals throughout.

DETAILED DESCRIPTION OF THE PREFERRED EMBODIMENTS

Because the examples are, for the most part, composed of (electronic) components and circuits known to those skilled in the art, circuit details will not be explained in any greater extent than that considered necessary for the understanding and appreciation of the underlying concepts of the present invention and in order not to obfuscate or distract from the teachings of the present invention.

Figure 1:
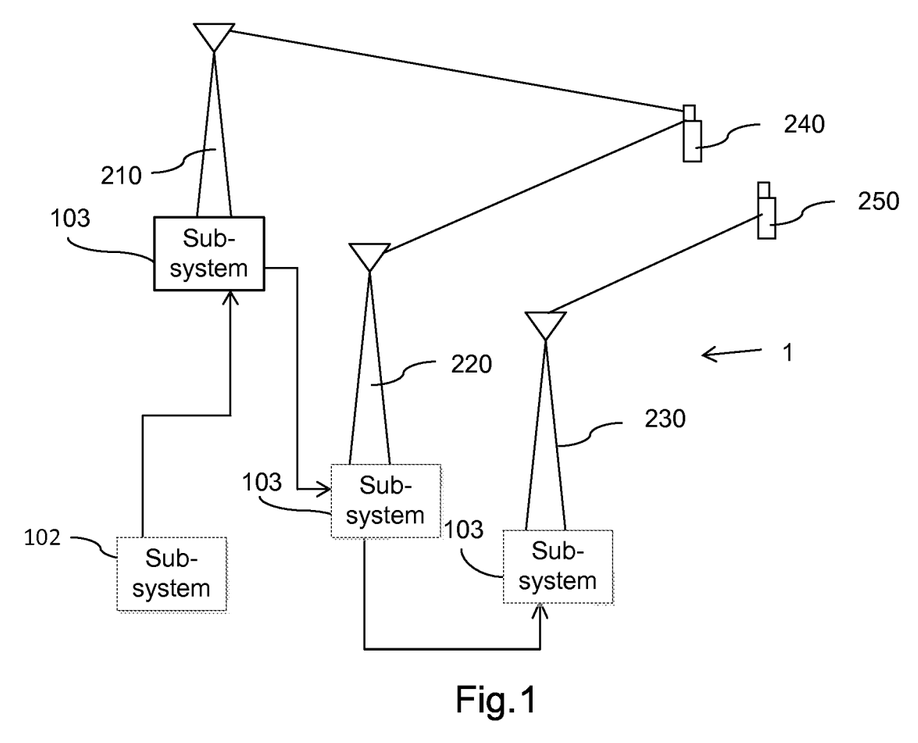
FIG. 1 shows schematic view of an example of a mobile communication system.

FIG. 1 shows an example of an overview of a mobile communication base-station system 1. The base-station system 1 comprises a chain of sub-systems 102, 103 comprising one or more first sub-systems 102, e.g. a baseband sub-system such as a CPRI Radio Equipment Controllers (REC), and one or more second sub-systems 103, e.g. RF sub-systems such as a CPRI Radio Equipment (RE).

In the example, each of the second subsystems 103 is connected to a respective antenna 210,220,230 for transmitting and receiving radio signals. The antennas 210,220,230 provide a radio connection from and/or to mobile devices 240, 250, also referred to as user equipment (UE), such as a mobile telephone or another type of device used directly by an end-user to communicate over the mobile communication network of which the base-station is part. A first user equipment 240 is shown to communicate with multiple, e.g. two, antennas 210 and 220, e.g. in a communication handover process, and the other user equipment 250 is shown to communicate with a single antenna 230.

Figure 2:
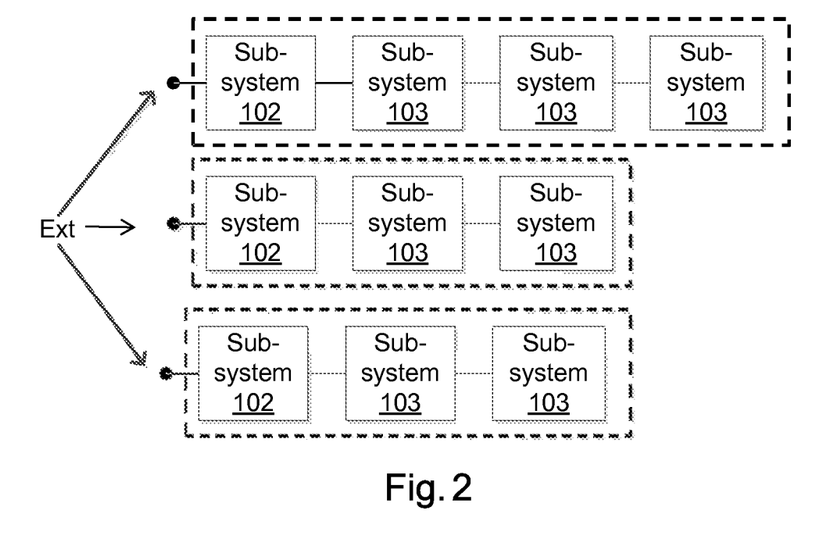
FIG. 2 shows a configuration of chains of sub-systems, suitable for the example of FIG. 1.

In the example of FIG. 1 only a single chain is shown, for sake of simplicity. However it will be apparent that the system may comprise two or more chains of a suitable topology, as e.g. shown in FIG. 2 or 4. As shown in FIG. 2, the mobile communication network may comprise multiple chains. The chains may have the same, or a different, number of sub-elements and may have the same or a different topology. The synchronization masters 102 of the different chains may be connected to the same external synchronization source Ext and synchronize their timing to an external synchronization signal provided by the external source Ext, such as a GPS or Ethernet signal. Thereby, it can be ensured that not only the timing of the sub-systems in the same chain, but also between the different chains is synchronized.

Referring back to FIG. 1, the first sub-system 102 controls one or more aspects of the second sub-systems 103, and notably can control the clock synchronization of the sub-systems controlled by the first sub-system and hence acts as a synchronization master. In the shown example, the first sub-system 102 is a synchronization master controlling a time synchronization of the sub-systems in the chain of which the first sub-system is the synchronization master. The first sub-system 102 transmits a signal to the second subsystems in the chain which allows the second subsystems to synchronize their timing to the first sub-system, e.g. using clock and data recovery to extract the clock from a data signal, such as a signal defined in common public radio interface, CPRI, specification version 1.4, 2.1, 3.0, 4.0, 4.1, 4.2, 5.0, 6.0 or higher, which can be downloaded from www.cpri.info and the contents of which are incorporated herein by reference.

Figure 3:
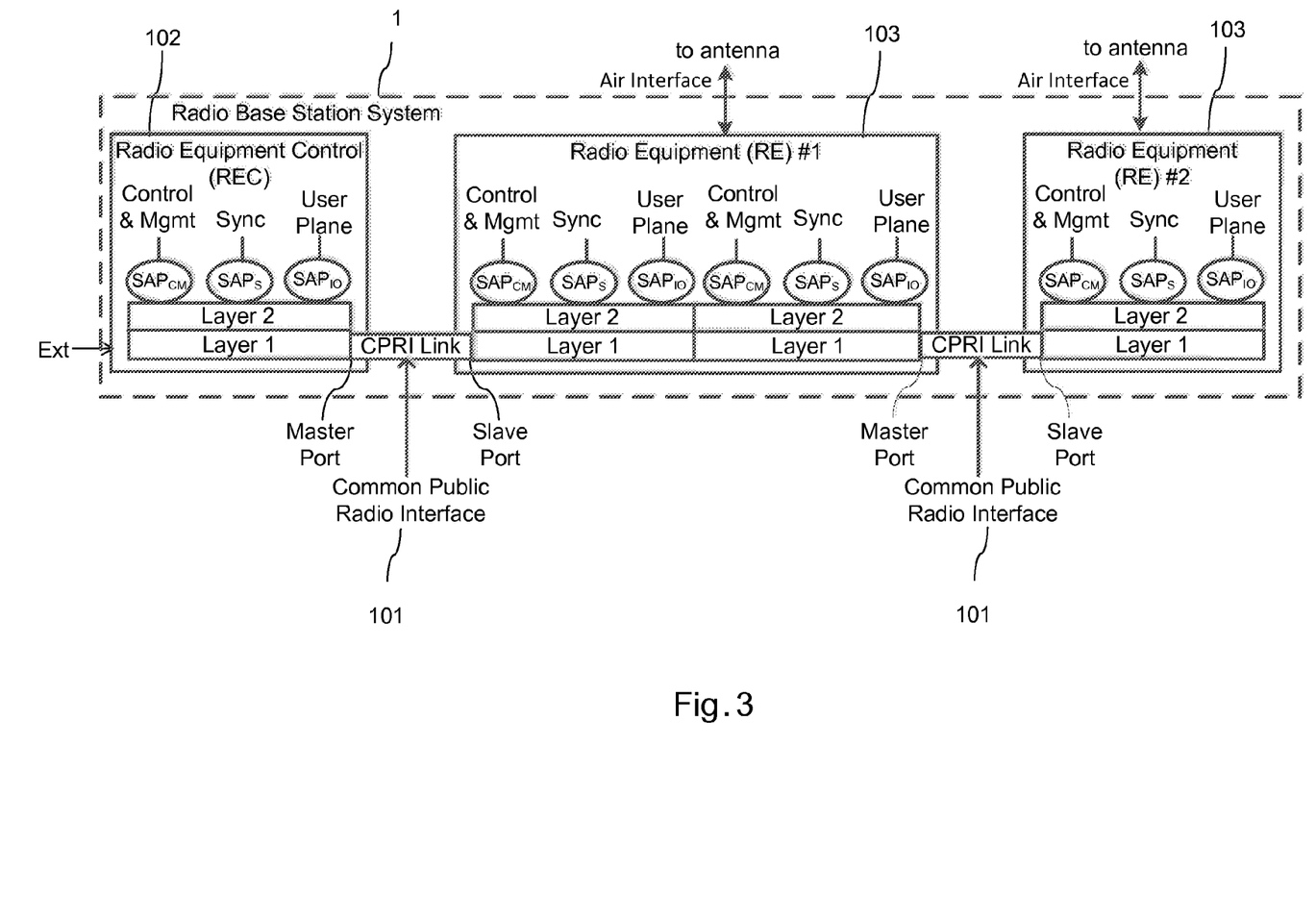
FIG. 3 shows a block diagram of different sub-systems in a chain, suitable for the examples of FIGS. 1 and 2.
Figure 4:
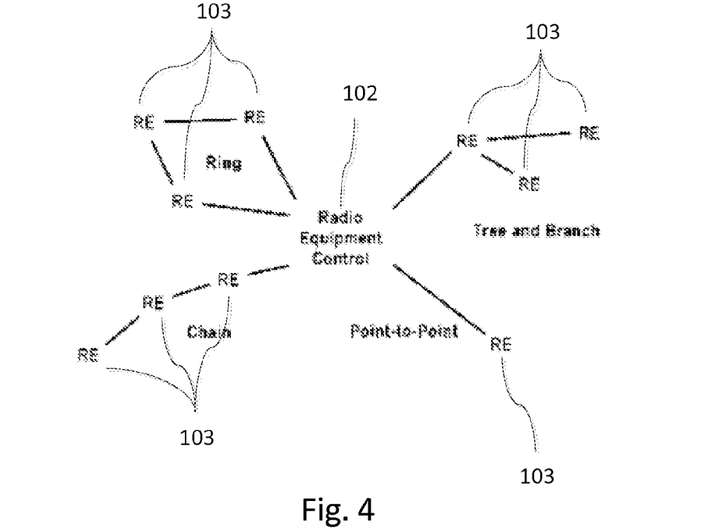
FIG. 4 shows a block diagram illustrating different ways of connecting sub-systems in a chain suitable for the examples of FIGS. 1 and 2.

Referring now to FIG. 3, the sub-elements in a chain may be connected via respective interfaces 101. The interface between the sub-systems allows the sub-systems to communicate data in accordance with a communication protocol common to the sub-systems, e.g. compliant or compatible with the CPRI specification. The interface allows to interconnect multiple sub-systems via a point-to-point connections, e.g. in a chain, ring or tree topology, as illustrated in FIG. 4. The interfaces can provide a single point-to point connection between sub-systems and/or multiple point-to-point connections between sub-systems. Thus, for example a second sub-system can be connected to multiple first sub-systems, a first sub-system can be connected to multiple second sub-systems, and between two sub-systems multiple connections may be present. Thereby, the chain can e.g. have a star, chain, ring or tree topology.

The interfaces 101 have a master port and a slave port. Each point-to-point link may for example have a master port in a first sub-element and a slave port in another sub-element. A slave port is connectable to a master port, and a sub-element synchronizes to the clock received at the slave port. Thus, each sub-element is a synchronization master of the sub-elements connected to its master port, and a synchronization slave of the sub-element connected to its slave port. For example, the clock used for frequency generation in the sub-element may be synchronized to the bit clock of the data received at the slave port. For example, each sub-element can receive on its slave port a clock traceable to the main clock of the synchronization master, e.g. by each sub-element using a transmit clock to output data at its master ports generated from the clock retrieved from one of its slave ports, e.g. by using the main clock as an input of a PLL and the PLL outputted clock as the transmit clock.

In the following example, for ease of understanding, the interface is supposed to be compliant with the CPRI specifications as defined in "Common Public Radio Interface (CPRI); Interface Specification V6.0 (2013 Aug. 30)", which is incorporated herein by reference, and herein after referred to as a CPRI interface. As example of a base-band sub-system the Radio Equipment Controllers (REC) defined in CPRI is used, whereas as an example of an RF sub-system the Radio Equipment (RE) defined in CPRI is used. However, the interface may be any other suitable interface, such as compliant or compatible with another CPRI version or with OBSAI, and the sub-system may be any other type of sub-system suitable for a base-station system.

The REC is an example of a base-band subsystem containing the functions of the digital baseband domain, such as the network interface transport, the radio base station control and management as well as the digital baseband processing (such as coding, interleaving etc). The RE is an example of an RF subsystem containing the analogue radio frequency functions, such as RF filtering, RF modulation, frequency conversion and RF amplification.

A CPRI compliant or compatible system may have multiple RECs and/or multiple RE's connected via point-to-point links using high frequencies (e.g. in the GHz range, such as between 1 and 10 GHz, such as around 1.2288, 2.4576, 4.9152 or 9.8034 GHz) for streaming interfacing. The data rate of the interface may be an integer multiple (e.g. 40, 80, 160, 320) of the reference clock of the synchronization master. Data samples are received at the RE and interfaced to the REC via an IQ data link called a plane, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

As for other types of interfaces, CPRI uses a synchronized clock distributed across the sub-systems in a chain. In order to synchronize, each chain of sub-systems comprises a REC which is a timing master, hereinafter a REC-master, which controls time-synchronization. A REC-master may control transmission of a periodic timing signal to which the sub-elements synchronize their clocks. For example, periodically e.g. every 10 ms, a predetermined sequence of bits which operates as synchronization signal may be transmitted by the REC-master, and be re-transmitted by the sub-systems in the CPRI chain on their master ports. (In CPRI, the predetermined sequence of bits indicates a start of a 10 ms frame consisting of 150 hyperframes, which in turn consists of 256 basic frames.) This synchronization signal is thus common to all the sub-systems in the chain. The bit clock of this synchronization signal may be a divided clock of the transmit clock. Thereto the Radio Equipment Controllers (REC) may be provided with a clock generator which can be synchronized to the external synchronization signal. In the clock generator, the clock synchronization may be implemented using a controller device.

To synchronize between the different chains in a system, each REC-master may synchronize its own clock with the external synchronization signal Ext. An example of an external synchronization signal is the Global Positioning System signal, which has an output of 1 PPS (pulse per second) synchronized to UTC (Universal Time Coordinated) with an accuracy of +/−1 µS. As another example, IEEE1588 over Ethernet or other protocol used to synchronize clocks throughout a computer network. may be used to provide a common external synchronization signal to the different chains. IEEE1588 over Ethernet can have an output of 100 Hz (10 ms frame sync) synchronized over the Ethernet connection.

Figure 5:
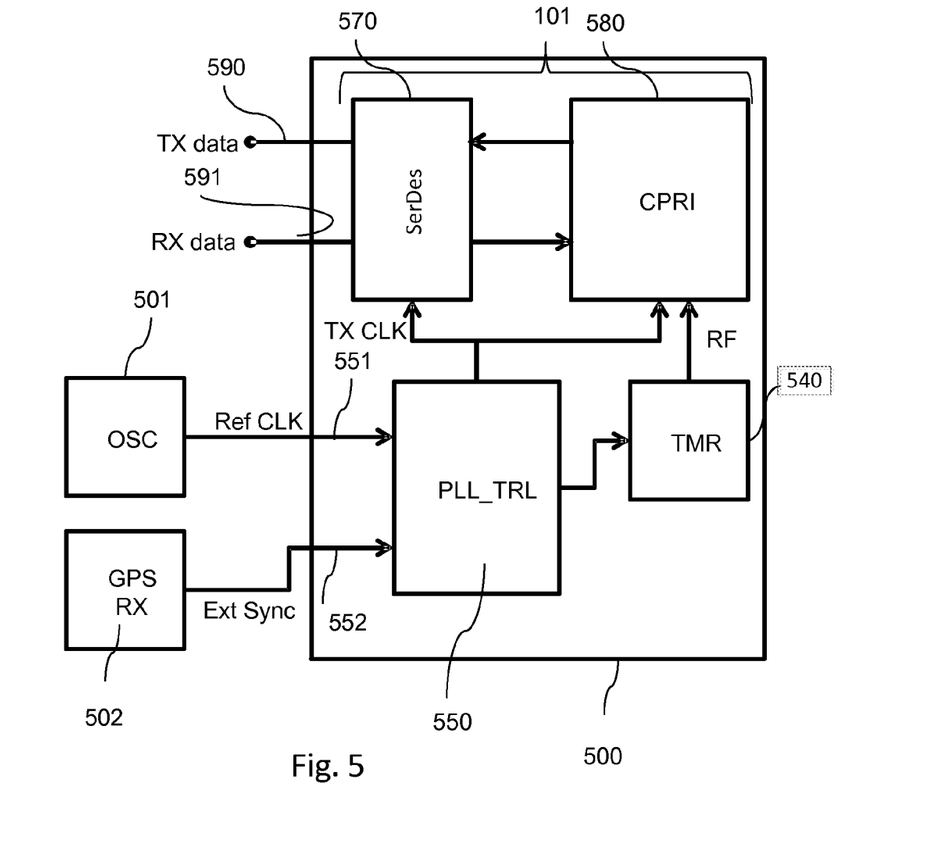
FIG. 5 shows a block diagram of an example of a synchronization master not requiring an external synchronization device, suitable for the examples of FIGS. 1-4.

Referring now to the example of FIG. 5, as shown, a controller device 500 such as a synchronization master, such as a CPRI REC-master may comprise an interface 101, comprising in this example a serializer/deserializer (SerDes) 570 and a CPRI unit 580, a tracking clock circuit (PLL_TRL) 550, and a timer 540. The SerDes is connectable to a transmit path 590 and a receive path 591 outside the master, to transmit and receive respectively serial data. The CPRI unit 580 is a logic circuit arranged to control the CPRI functions of the REC-Master, and which generates the data to be outputted by SerDes 570 and processes the data received from the receive path 591, e.g., in case of CPRI generates the CPRI compliant frames which are serialized by SerDes into a CPRI compliant bit-stream. Both the SerDes 570 and the CPRI unit 580 are connected to the tracking clock circuit 550 to receive a transmit clock signal TX CLK generated by the tracking clock circuit 550, which clocks the bits outputted.

The timer 540 is connected to the tracking clock circuit 550 to receive a timer clock signal, for example with a clock cycle corresponding to the duration of a hyper frame or other sub-units of the 10 ms frame. The timer 540 is connected to the CPRI unit 580 and outputs a clock signal with a clock cycle is corresponding to the duration of the 10 ms frame, and which clocks the start of the 10 ms frame transmission by the CPRI unit.

In a practical example, a reference clock (e.g. 122.88 MHz) Ref CLK is input to the tracking clock circuit and TX CLK (e.g. 1228.8 MHz) is created by the tracking clock circuit out of Ref CLK, with a clock frequency which is an integer multiple of the frequency of Ref CLK, and synchronized to the external synchronization signal Ext Sync. A frame clock based on the TX clock, for example the link rate/40, is going to the timer unit 540. A RF clock (100 Hz) is created by the TMR module out of the frame clock.

For the sync input the following examples may for instance be used. A GPS clock (e.g. 100 Hz) may be created by a GPS receiver, allowing synchronization to UTC. A 1588 clock or ETH clock (e.g. 100 Hz) may be created by a so called frame manager of an Ethernet receiver/transmitter (as are commercially available), which is an Ethernet controller that includes a framer/de-framer of Ethernet packets. Note that IEEE1588 over Ethernet is shortly called 1588.

It will be apparent that a REC may comprise other logic circuits than the units shown, and that the REC may be part of an integrated circuit, e.g. a system on a chip (such as a baseband processor) comprising in addition to the REC one or more other logic circuits out of: central processing units, digital signal processing cores (such as vector processing cores), and peripherals such as on-chip hardware accelerators for e.g. baseband (such as WCDMA, FFT, etc) and encryption, external interfaces or timer units. The logic circuits may be connected to each other through a suitable switching fabric, such as provided by Freescale Semiconductors, Inc of Austin Tex. under the name "CoreNet".

The tracking clock circuit 550 is connected to an external oscillator 501 which provides a reference clock Ref CLK to the tracking clock circuit, and to an external synchronization source 502, such as a GPS receiver, which provides an external synchronization signal Ext Sync, via respectively a reference clock input 551 and the external sync input 552. As shown the oscillator 501 is not controlled by the tracking clock circuit or the REC and the REC does not have an external synchronization device which synchronizes the reference clock Ref CLK to the external synchronization signal Ext Sync.

As shown in FIG. 5 and explained in more detail with reference to the examples of FIGS. 6 and 7, the tracking clock circuit 550 is connected to the clock input 551 and the sync input 552, and generates the transmit clock TX CLK based on the reference clock Ref CLK and the external synchronization signal Ext Sync.

Figure 6:
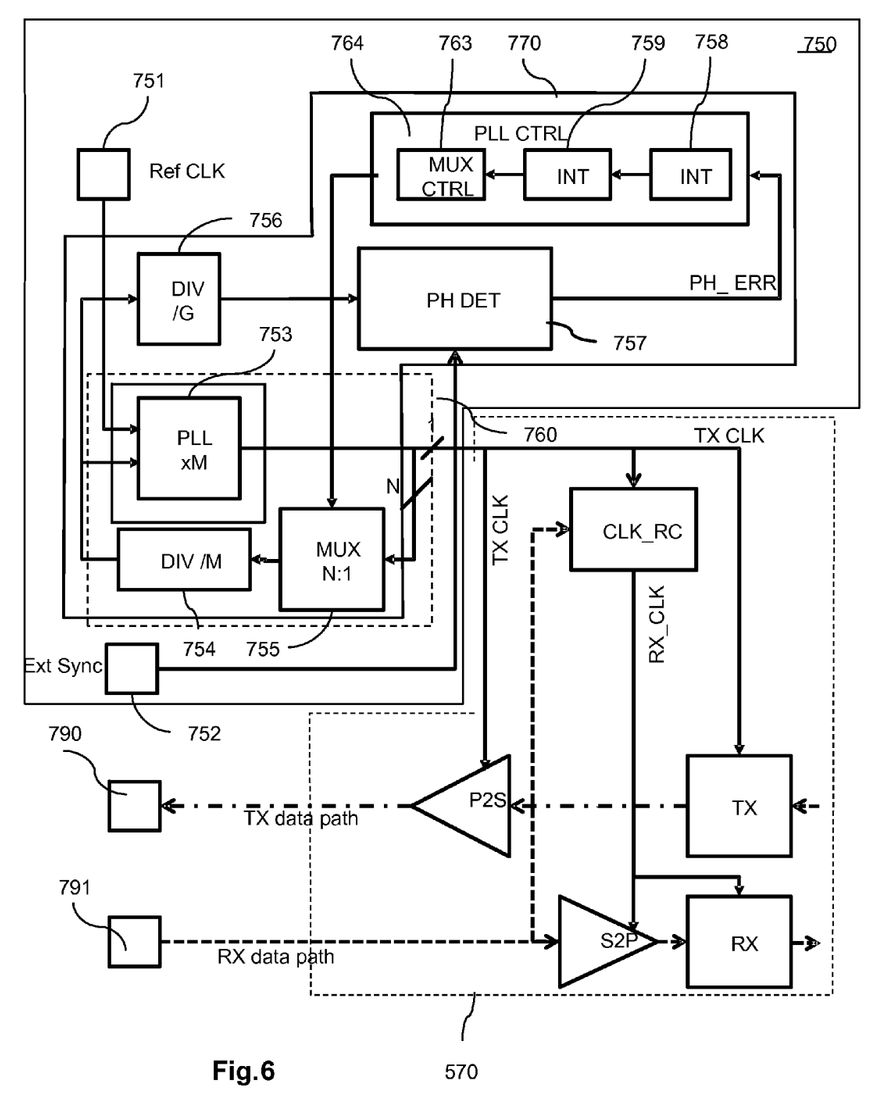
FIG. 6 shows a block diagram of a first example of a controller device suitable for the example of FIG. 5.

As shown in FIG. 6, the tracking clock circuit 750 may be connected to a serializer/deserializer 570 as shown. The tracking clock circuit 750 may output a transmit clock Tx CLK to the serializer/deserializer 570. As shown the serializer/deserializer 570 comprises a transmitter TX, which is clocked by the transmit clock Tx CLK. As shown, the transmit clock Tx CLK is provided to a parallel to serial converter P2S to clock the transmitted signal transmitted thereby to a transmit data output 790. The transmit clock Tx CLK is used further by a clock recovery circuit CLK_RC to create the receive clock RX_CLK. The receive clock RX_CLK is used to clock serial to parallel converter S2P and a receiver RX to receive a received signal via a receive data input 791.

Figure 7:
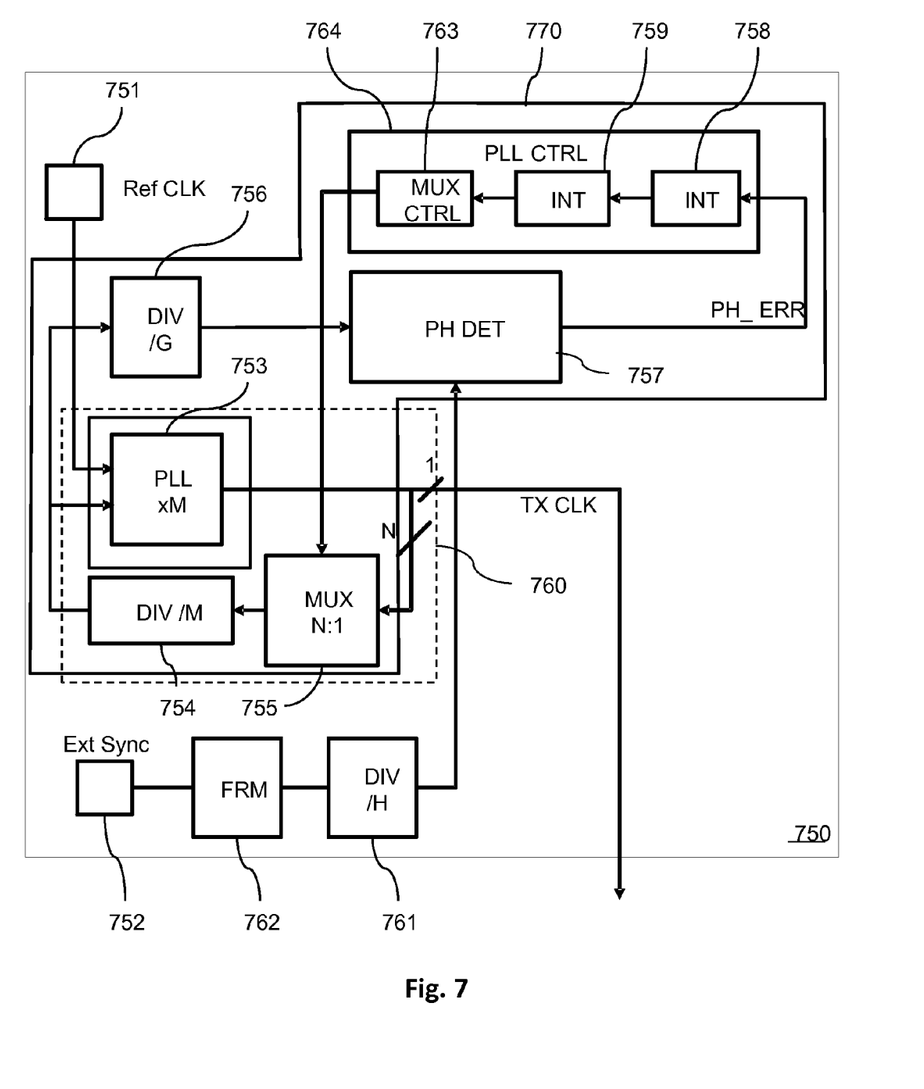
FIG. 7 shows a block diagram of a second example of a controller device suitable for the example of FIG. 5.

Referring now to FIGS. 6 and 7, the examples of a tracking clock circuit 750 shown therein comprise a controllable phase locked loop, PLL, 760 which generates the transmit clock TX CLK. The PLL comprises a PLL output for outputting the transmit clock TX CLK, a first phase input coupled to the reference clock input 751 and a second phase input coupled to the PLL output via a negative feedback loop.

The tracking clock circuit 750 further comprises a frequency tracking loop 770, in this example a frequency/phase tracking loop. The loop in the examples is a second order tracking loop but higher order tracking loops may be used as well. The frequency/phase tracking loop 770 is connected with a first input to the external sync input 752 and another tracking loop input is connected to the PLL, in this example to the second phase input thereof, and with a tracking loop output to a control input of the PLL. The frequency tracking loop provides a signal to the control input which controls a parameter of the PLL, and basically provides a negative feedback which counters the phase error between the external synchronization signal and the PLL feedback signal. It has been found that this allows a precise synchronization, without requiring an external synchronization device or control of an external oscillator.

The PLL may be any PLL suitable for the specific implementation, and for example be analog or digital, such as partially or all digital. As shown in the example, the PLL may for example be a multiplying phase locked loop for generating the transmit clock Tx CLK with a clock frequency which is an integer multiple M of the frequency of the reference clock Ref CLK. As shown in the examples of FIGS. 6 and 7, the PLL may comprise a forward loop with a frequency multiplier 753, which multiplies the frequency of the reference clock with a multiplication factor that is dependent on the phase difference between the reference clock signal Ref CLK and the feedback signal, e.g. using a phase detector and a voltage controlled oscillator as known in the art, and outputs the transmit clock TX CLK. In the shown example, the PLL is a multiple-phase PLL having multiple PLL sub-outputs providing N (N being a positive integer) different phases of the transmit clock simultaneously, and selects a selected one of the PLL sub-outputs to output the clock signal with that phase as the actual transmit clock TX CLK. The different phases may for example be evenly partitioned along the phase axis (e.g. distanced by $2\pi/N$).

As shown in FIGS. 6 and 7, the PLL 760 further comprises a negative feedback loop which provides the feedback signal to the second phase input. The negative feedback loop may as shown comprise a frequency divider 754 arranged to divide the frequency of the transmit clock with an integer M, and to output a divided transmit clock to the second phase input. As shown, the divider 754 has a divider input coupled to the PLL output, for receiving the transmit clock and a divider output connected to the second phase input for providing to the second phase input the divided transmit clock. In case of a multi-phase PLL, as shown, a multiplexer 755 may be present between the PLL output and the frequency divider 754 which allows selecting a selected phase out of the N phases at the PLL output. For example, the multiplexer 755 may have a control input at which a phase control signal can be provided to select one of the N input signals as the multiplexer output. The tracking loop may provide this phase control signal so as to select a PLL sub-output depending on the phase error detected by the phase detector. By dynamically choosing the right phase, the synchronization is maintained. This allows synchronizing with the external synchronization signal without using an external synchronization device.

The tracking loop 770 may be implemented in any manner suitable for the specific implementation to synchronize the PLL feedback signal to the external synchronization signal Ext Sync. In the shown example, the tracking loop comprises a phase detector (PH DET) 757 coupled to the sync input 752 and to the second phase input of the PLL. The phase detector can detect a phase error between the external synchronization signal Ext Sync and a feedback signal inputted to the PLL at the second phase input of the PLL 760. In the shown example, the phase detector 757 is connected to a node between the divider 754 and the second phase input of the PLL, and more specifically via a first pre-divider 756 which connects the second phase input to the phase detector. The first pre-divider divides the frequency of the feedback signal by a first division factor G, and accordingly the phase detector 757 in the tracking loop 770 receives the feedback signal with a divided frequency. The first division factor G may e.g. be equal to the ratio of the frequency of the reference clock and the frequency of the external synchronization signal, thereby providing a signal to the phase detector 757 which has the same frequency as the external synchronization signal Ext sync (when the PLL is stabilized and the feedback signal thus has about the same frequency as the reference clock Ref CLK).

The tracking loop 770 further comprises a control circuit 764, PLL CTRL, (comprising in the examples two integrators 758 and 759 in series with a mux controller 763) which generates a control signal based on the detected phase error, in this example a phase control signal. The control circuit is coupled to a control input of the controllable PLL, and can provide the control signal thereto. Thereby a phase and/or frequency of the feedback signal can be controlled to counter the phase error between the external synchronization signal and the feedback signal. It will be apparent that the phase control circuit may be connected to any suitable control input of the PLL 760 that allows controlling the phase and/or frequency of the feedback signal. For instance, the phase control circuit can be connected to a node between the PLL output and the divider input, e.g., in the feedback loop of the PLL 760, and more specifically in the example is connected to a control input of the multiplexer 755, as explained above, to control the selection of the phase. However, alternatively, e.g. the division ratio of the divider 754 may be controlled or any other parameter of the PLL controlling the phase and/or frequency of the feedback signal.

In the shown example, the control circuit 764 controls the phase, and uses the PLL as a low-pass filter. For example, if the tracking loop requires a feedback divider value of 13.333333, the control circuit quickly toggles the phase such that the effective division of the negative feedback loop of the PLL is toggling between 13 and 14, ⅔ of the time at 13 and ⅓ of the time 14, with gives a weighted average value of (⅔*13)+(⅓*14)=13.3333. This toggling happens at a frequency much higher than the PLL bandwidth, and the PLL's low-pass filter characteristics will filter the toggling out, resulting in the weighted average value as division ratio. Said differently, the control circuit will pulse width modulate the signal, and the PLL will perform low pass filtering thereof. This enables to achieve a finer resolution, finer control of frequency and phase than would otherwise be possible.

Figure 8:
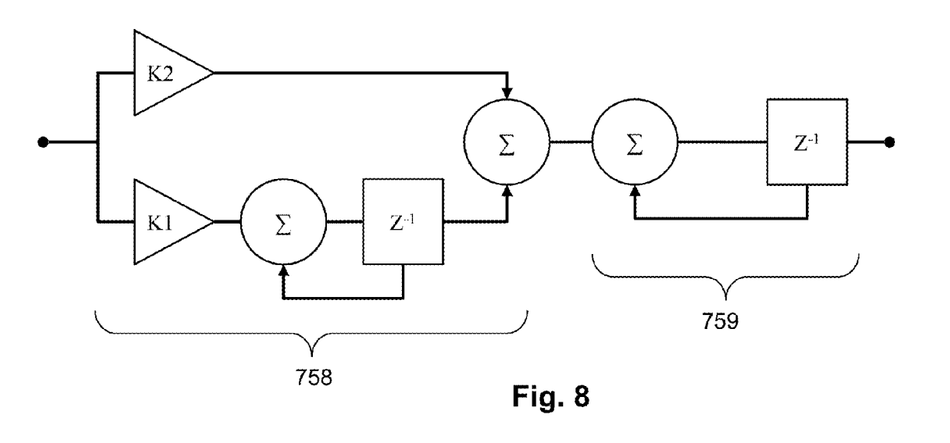
FIG. 8 shows a block diagram an example of a phase control circuit suitable for the example of FIGS. 5-7.

Referring to FIG. 8, the control circuit may comprise two integrators 758 and 759 in series with the multiplexer control 763. Those two integrators 758 and 759 allow the loop to track frequency offsets (or phase ramps) with zero steady-state phase error in the presence of a fixed frequency offset. This helps recovering the incoming data error free. The value added in the first integrator is proportional to the frequency offset (or difference) between the feedback signal and the external synchronization signal. The second integrator 759 converts the frequency offset above into a change in phase, e.g., the frequency offset is being integrated (or counted) to produce a phase output ramp. The multiplexer control 763 converts the phase output ramp into clock mux select inputs, e.g. by comparing the phase output ramp with multiple different levels and selecting a mux input as a function of the levels exceeded.

The integrator 758 may be configurable integrator having a configuration input for adjusting the integration constant to accommodate different transmit clock frequencies. In the example of FIG. 8, for instance, the configurable integrator has a configurable gain factor K1 in an integrating path and a configurable gain factor K2 in a direct path, both paths being summed by a summer Σ to constitute an integrator output signal. The coefficients K1 and K2 are chosen to set the tracking loop gain and bandwidth based on the phase tracking error performance required, and on how quickly the phase of the incoming serial data stream is changing. The K2 path is used to stabilize the tracking loop. The integrator is configurable according to the link rate by adapting the gain factor K1 and/or K2, and by setting the factors K1 and K2 a suitable value can be configured to supports any CPRI frequency.

Referring to the example of FIG. 7, the tracking clock circuit shown therein is suitable for Ethernet. In addition to the elements of the example of FIG. 6, the circuit shown in FIG. 7 comprises a second pre-divider 761 coupled between the sync input and the phase detector, the second pre-divider being arranged for dividing the frequency of the external synchronization signal by a second division factor H. In a controller device having both the first pre-divider 756 and the second pre-divider 761 the ratio of the first division factor G and the second division factor H represents a ratio of the frequency of the reference clock, $F_{REF}$, and the frequency of the external synchronization signal $F_{NETW}$, i.e. $G/H=F_{REF}/F_{NETW}$.

In the shown example, the tracking clock circuit further comprises a frame manager FRM 762, as generally known for receiving Ethernet data, which connects the External Synch input 752 to the second pre-divider 761. In operation, an Ethernet signal as delivered over SGMII or RGMII port is processed by the frame-manager which recovers the 1588 clock there from. The frame-manager outputs the 1588 clock, which is then divided by H, to match the divided reference clock (divided by G). It will be apparent that the frame manager 762 may be omitted, and the tracking clock circuit may have configurable pre-dividers having division factors G and H like in FIG. 7 but without the frame manager 762, thereby allowing synchronizing to any external synchronization signal.

The examples of FIG. 5-8 may be used in a method of controlling a base station system comprising one or more chains of one or more first sub-systems 102 and one or more second sub-systems 103. One of the first systems in the chain is arranged to control the other sub-systems in the chain, and notably to control a time synchronization of the sub-systems, and hence is a synchronization master or time master. The method may start with receiving a reference clock at a clock input and an external synchronization signal at an external sync input. A transmit clock TX CLK may be generated from the reference clock signal and the external synchronization signal. As shown, this generating may comprise a controllable phase locked loop, PLL receiving the reference clock at a first phase input and generation of the transmit clock. The PLL outputs the transmit clock at a PLL output and receives at a second phase input a feedback signal from a negative feedback loop between the PLL output and the second phase input.

A phase detector coupled to the sync input and the second phase input may detect a phase error between the external synchronization signal and a feedback signal inputted at the second phase input. A phase control signal is then generated by a phase control circuit based on the phase error, and the phase control signal coupled to a control input of the controllable PLL and thereby modulates a frequency of the transmit clock. A transmitter clocked with the transmit clock then transmits binary data from the first sub-system to the second subsystem, the binary data having a bit duration controlled by a clock cycle of the transmit clock.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the examples shown. For example, the connections may be any type of connection suitable to transfer signals from or to the respective nodes, units or devices, for example via intermediate devices. Accordingly, unless implied or stated otherwise the connections may for example be direct connections or indirect connections.

Furthermore, the synchronization master as well as the controller device may be implemented as, analog or digital, circuitry in an integrated circuit, such as provided on one or more dies in a single package. The integrated circuit may e.g. be a system on a chip (such as a baseband processor) comprising in addition to the synchronization master or controller device one or more other logic circuits out of: central processing units, digital signal processing cores (such as vector processing cores), and peripherals such as on-chip hardware accelerators for e.g. baseband (such as WCDMA, FFT, etc) and encryption, external interfaces or timer units. The logic circuits may be connected to each other through a suitable switching fabric, such as provided by Freescale Semiconductors, Inc of Austin Tex. under the name "CoreNet".

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Those skilled in the art will recognize that the boundaries between logic blocks are merely illustrative and that alternative embodiments may merge logic blocks or circuit elements or impose an alternate decomposition of functionality upon various logic blocks or circuit elements. Also, the invention is not limited to physical devices or units implemented in non-configurable hardware but can also be applied in configurable devices such as Field Programmable Gate Arrays (FPGA) or units suitably configured to obtain a synchronization master or a control device, e.g. through a suitable configuration of interconnects between logic blocks of an FPGA. Furthermore, the devices may be physically distributed over a number of apparatuses, e.g. multiple integrated circuits, while functionally operating as a single device. Also, devices func-

The invention claimed is:

1. A controller device for a data interface between sub-systems in a chain of at least two sub-systems in a mobile communication base station system, the sub-systems comprising at least one second sub-system and at least one first sub-system for controlling the second sub-system, at least one first sub-system being a synchronization master controlling a time synchronization of the sub-systems, the controller device comprising:
   a clock input for receiving a reference clock;
   a sync input for receiving an external synchronization signal;
   a tracking clock circuit connected to the clock input and the sync input, for generating a transmit clock based on the reference clock signal and the synchronization signal, the tracking clock circuit comprising:
      a controllable phase locked loop, (PLL), for generating the transmit clock, the PLL comprising a PLL output for outputting the transmit clock, a first phase input coupled to the reference clock and a second phase input coupled to the PLL output via a negative feedback loop; and
      a frequency and phase tracking loop coupling the sync input and the second phase input to a control input of the controllable PLL, for providing a negative feedback which controls a phase and/or frequency of the feedback signal to counter the phase error between the external synchronization signal and the feedback signal; and
   a transmitter for transmitting binary data from the first sub-system to the second subsystem, the binary data having a bit duration controlled by a clock cycle of the transmit clock, and the transmitter being connected with a clock input to the PLL output for clocking the transmitter with the transmit clock.

2. A device as claimed in claim 1, wherein:
   the negative feedback loop comprises a divider arranged to divide the frequency of the transmit clock and to output a divided transmit clock, the divider having a divider input coupled to the PLL output for receiving the transmit clock and having a diver output connected to the second phase input for providing to the second phase input the divided transmit clock; and
   the phase detector is connected to a node between the divider and the second phase input;
      and the phase control circuit is connected to a node between the PLL output and the divider input.

3. A device as claimed in claim 1, wherein the PLL is a multiple-phase PLL having multiple PLL sub-outputs providing different phases of the transmit clock, and the phase control signal is connected to the PLL for selecting a PLL sub-output depending on the phase error detected by the phase detector.

4. A device as claimed in claim 1, wherein the phase control circuit pulse width modulates the feedback signal and the PLL performs low-pass filtering of the feedback signal.

5. A device as claimed in claim 1 wherein the phase control circuit comprises a first integrator for integrating the phase error detected by the phase detector to obtain a value proportional to a frequency offset between the transmit clock and the reference clock.

6. A device as claimed in claim 1, wherein the tracking clock circuit comprises a first pre-divider between the second phase input and the phase detector, the first pre-divider being arranged for dividing the frequency of the feedback signal by a first division factor.

7. A device as claimed in claim 1, wherein the tracking clock circuit comprises a second pre-divider coupled between the sync input and the phase detector, the second pre-divider being arranged for dividing the frequency of the external synchronization signal by a second division factor.

8. A device as claimed in claim 1, wherein the sync input is arranged for receiving a global position system (GPS) clock signal.

9. A device as claimed in claim 1, wherein the sync input is arranged for receiving an Ethernet signal.

10. A device as claimed in claim 1, wherein the data interface is compliant or compatible with the common public radio interface specification version 1.4, 2.1, 3.0, 4.0, 4.1, 4.2, 5.0 or 6.0.

11. A baseband subsystem for a base station in a mobile communication system, comprising a device according to claim 1 and in which the baseband subsystem constitutes the first subsystem and is a synchronization master.

12. A device as claimed in claim 4, wherein the PLL comprises a multiplexer, nux, and phase control circuit comprises a mux control coupled to the output of the first integrator or the second integrator.

13. A device as claimed in claim 5, wherein the integrator is a configurable integrator having a configuration input for adjusting an integrator gain to accommodate different transmit clock frequencies.

14. A device as claimed in claim 5, wherein the phase control circuit comprises a second integrator for converting the frequency offset into a change in phase to be applied to the transmit clock.

15. A device as claimed in claim 6, wherein the first division factor corresponds to a ratio of the frequency of the reference clock and the frequency of the external synchronization signal.

16. A device as claimed in claim 6, wherein a ratio of the first division factor and the second division factor corresponds to a ratio of the frequency of the reference clock and the frequency of the external synchronization signal.

17. A device as claimed in claim 9, wherein the sync input comprises an Ethernet controller for deriving a frame synchronization signal from the Ethernet signal.

18. A mobile communications base station system, comprising at least one chain of at least two sub-systems, the sub-systems comprising at least one second sub-system and at least one first sub-system for controlling the second sub-system, at least one first sub-systems being a synchronization master controlling a time synchronization of the sub-systems, wherein the first subsystem is a baseband subsystem as claimed in claim 11, and the second subsystem is a radio frequency subsystem.

19. A method for controlling a base station system comprising at least one chain of at least two sub-systems, the sub-systems comprising at least one second sub-system and at least one first sub-system for controlling the second sub-system, at least one first sub-systems being a synchronization master controlling a time synchronization of the sub-systems, the method comprising:
   receiving a reference clock at a clock input;
   receiving an external synchronization signal at a sync input;
   generating a transmit clock from the reference clock signal and the synchronization signal, said generating comprising:
      a controllable phase locked loop, (PLL) receiving the reference clock at a first phase input, and generating the transmit clock, the PLL outputting the transmit clock at a PLL output and receiving at a second phase input a feedback signal from a negative feedback loop between the PLL output and the second phase input;
      a phase detector, coupled to the sync input and the second phase input, detecting a phase error between the external synchronization signal and a feedback signal inputted at the second phase input; and
      a phase control circuit generating a phase control signal based on the phase error, and coupling the phase control signal to a control input of the controllable PLL thereby modulating a frequency of the transmit clock; and
   transmitting by a transmitter binary data from the first sub-system to the second subsystem, the binary data having a bit duration controlled by a clock cycle of the transmit clock, and clocking the transmitter with the transmit clock.

20. A non-transitory computer program product comprising instructions for causing a processor system to perform the method according to claim 19.

* * * * *